US011054963B2

(12) United States Patent
Han et al.

(10) Patent No.: US 11,054,963 B2
(45) Date of Patent: Jul. 6, 2021

(54) METHOD FOR DISPLAYING NAVIGATOR ASSOCIATED WITH CONTENT AND ELECTRONIC DEVICE FOR IMPLEMENTING THE SAME

(71) Applicant: Samsung Electronics Co., Ltd., Gyeonggi-do (KR)

(72) Inventors: Jonghyun Han, Seoul (KR); Ho Young Lee, Seoul (KR); Chaekyung Lee, Seoul (KR); Bo-Keun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/710,928

(22) Filed: Sep. 21, 2017

(65) Prior Publication Data
US 2018/0081520 A1    Mar. 22, 2018

(30) Foreign Application Priority Data
Sep. 21, 2016  (KR) .......................... 10-2016-0120610

(51) Int. Cl.
*G06F 3/0482* (2013.01)
*G06F 3/0481* (2013.01)
(Continued)

(52) U.S. Cl.
CPC .......... *G06F 3/04815* (2013.01); *G06F 3/011* (2013.01); *G06F 3/012* (2013.01);
(Continued)

(58) Field of Classification Search
CPC ............. G06F 3/04815; G06F 3/04842; G06F 3/0482; G06F 3/012; G06F 3/011;
(Continued)

(56) References Cited

U.S. PATENT DOCUMENTS 6,759,972 B2 *   7/2004   Gupta .................. G08B 27/008
340/3.52
8,902,255 B2   12/2014   Papaefstathiou et al.
(Continued)

FOREIGN PATENT DOCUMENTS

EP    3 054 415 A1    8/2016
EP    3299933 A1    3/2018
(Continued)

OTHER PUBLICATIONS

European Search Report; dated Jan. 22, 2018.
(Continued)

*Primary Examiner* — Keith D Bloomquist
(74) *Attorney, Agent, or Firm* — Cha & Reiter, LLC

(57) ABSTRACT

Various embodiments provide an electronic device and a method of operating the same. The electronic device includes a display, a memory, and at least one processor functionally connected to the display or the memory. The at least one processor is configured to: acquire a content type or object information associated with executed content; create a navigator using the content type or the object information; arrange the created navigator in the content; and display the navigator according to a user's gaze information. Other embodiments may also be made.

20 Claims, 13 Drawing Sheets

(51) Int. Cl.
*G06F 3/01* (2006.01)
*G06F 3/0484* (2013.01)
*G06T 19/00* (2011.01)
*G06F 3/0362* (2013.01)

(52) U.S. Cl.
CPC .............. *G06F 3/013* (2013.01); *G06F 3/017* (2013.01); *G06F 3/0482* (2013.01); *G06F 3/04842* (2013.01); *G06T 19/003* (2013.01); *G06F 3/0362* (2013.01)

(58) Field of Classification Search
CPC ........ G06F 3/017; G06F 3/013; G06F 3/0362; G09T 19/003; G06T 19/003; G02B 27/017; G02B 27/01; H04N 13/332; H04N 21/482; H04N 21/47
USPC .................................................. 715/850, 851
See application file for complete search history.

(56) References Cited

U.S. PATENT DOCUMENTS

| | | |
|---|---|---|
| 8,963,916 B2 | 2/2015 | Reitan |
| 9,007,430 B2 | 4/2015 | Seidl et al. |
| 2012/0146896 A1* | 6/2012 | Eckl .......................... G06T 1/00 |
| | | 345/156 |
| 2013/0326419 A1 | 12/2013 | Harada et al. |
| 2013/0339864 A1* | 12/2013 | Uusitalo ................ H04W 48/18 |
| | | 715/736 |
| 2014/0375683 A1 | 12/2014 | Salter et al. |
| 2015/0153913 A1 | 6/2015 | Ballard et al. |
| 2015/0193018 A1* | 7/2015 | Venable ................ G06F 3/0346 |
| | | 345/158 |
| 2015/0212322 A1 | 7/2015 | Moravetz |
| 2015/0228124 A1 | 8/2015 | Kim et al. |
| 2016/0232879 A1* | 8/2016 | Han ...................... G02B 27/017 |
| 2016/0274762 A1* | 9/2016 | Lopez .................. G06T 19/006 |
| 2018/0081520 A1 | 3/2018 | Han et al. |

FOREIGN PATENT DOCUMENTS

| | | |
|---|---|---|
| JP | 2014-006880 A | 1/2014 |
| KR | 2000-0054149 A | 9/2000 |

OTHER PUBLICATIONS

European Search Report dated Jan. 31, 2019.
European Search Report dated Jun. 25, 2019.
Chinese Search Report dated May 26, 2020.
European Search Report dated Mar. 6, 2020.
European Search Report dated Apr. 28, 2021.
Chinese Search Report dated May 6, 2021.

\* cited by examiner

METHOD FOR DISPLAYING NAVIGATOR ASSOCIATED WITH CONTENT AND ELECTRONIC DEVICE FOR IMPLEMENTING THE SAME

CLAIM OF PRIORITY

This application claims priority under 35 U.S.C. § 119(a) to Korean Patent Application Serial No. 10-2016-0120610, which was filed in the Korean Intellectual Property Office on Sep. 21, 2016, the content of which is incorporated herein by reference.

TECHNICAL FIELD

Various embodiments relate to a method and display for displaying a navigator associated with content.

BACKGROUND

Various types of electronic devices, such as a mobile communication terminal, a Personal Digital Assistant (PDA), an electronic organizer, a smart phone, a tablet Personal Computer (PC), and a wearable device, have been widely used with the recent development of the digital technology. Such electronic devices are continuously being improved in hardware and/or software portions thereof for supporting and enhancing the functions thereof.

Meanwhile, wearable devices may be various types of devices, such as a head-mounted display, a smart glass, a smart watch, a smart wristband, a contact lens-type device, a ring-type device, a shoe-type device, a garment-type device, or a glove-type device, that can be detachably attached to a portion of a human body or a piece of clothing. Such wearable devices are usable in connection with an electronic device. In addition, a wearable device may provide various user experiences by implementing virtual reality or augmented reality.

SUMMARY

Various embodiments provide an electronic device including a display, a memory, and at least one processor functionally connected to the display or the memory. The at least one processor may be configured to: acquire a content type or object information associated with executed content; create a navigator using the content type or the object information; arrange the created navigator in the content; and display the navigator according to a user's gaze information.

Various embodiments of the present disclosure provide a method of operating an electronic device. The method may include acquiring a content type or content information associated with executed content, creating a navigator using the content type or the object information, placing the created navigator in the content, and displaying the navigator according to the user's gaze information.

According to various embodiments, by displaying a navigator associated with a VR content, the user can easily select a desired item in the navigator.

According to various embodiments, by arranging a navigator associated with a VR content at the upper end or lower end of the user, it is possible to reduce the visual field disturbance of the user, and to utilize a distorted region of the content.

According to various embodiments, it is possible to configure and display an item, which exists outside the user's view in a VR space, as a navigator that can be easily grasped by the user.

According to various embodiments, it is possible to arrange a navigator in a region that does not overlap the VR content, and to display the navigator according to the user's viewing angle.

According to various embodiments, it is possible to facilitate spatial movement within content by arranging an item in a navigator based on the distance between the user's location and the item in the content.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
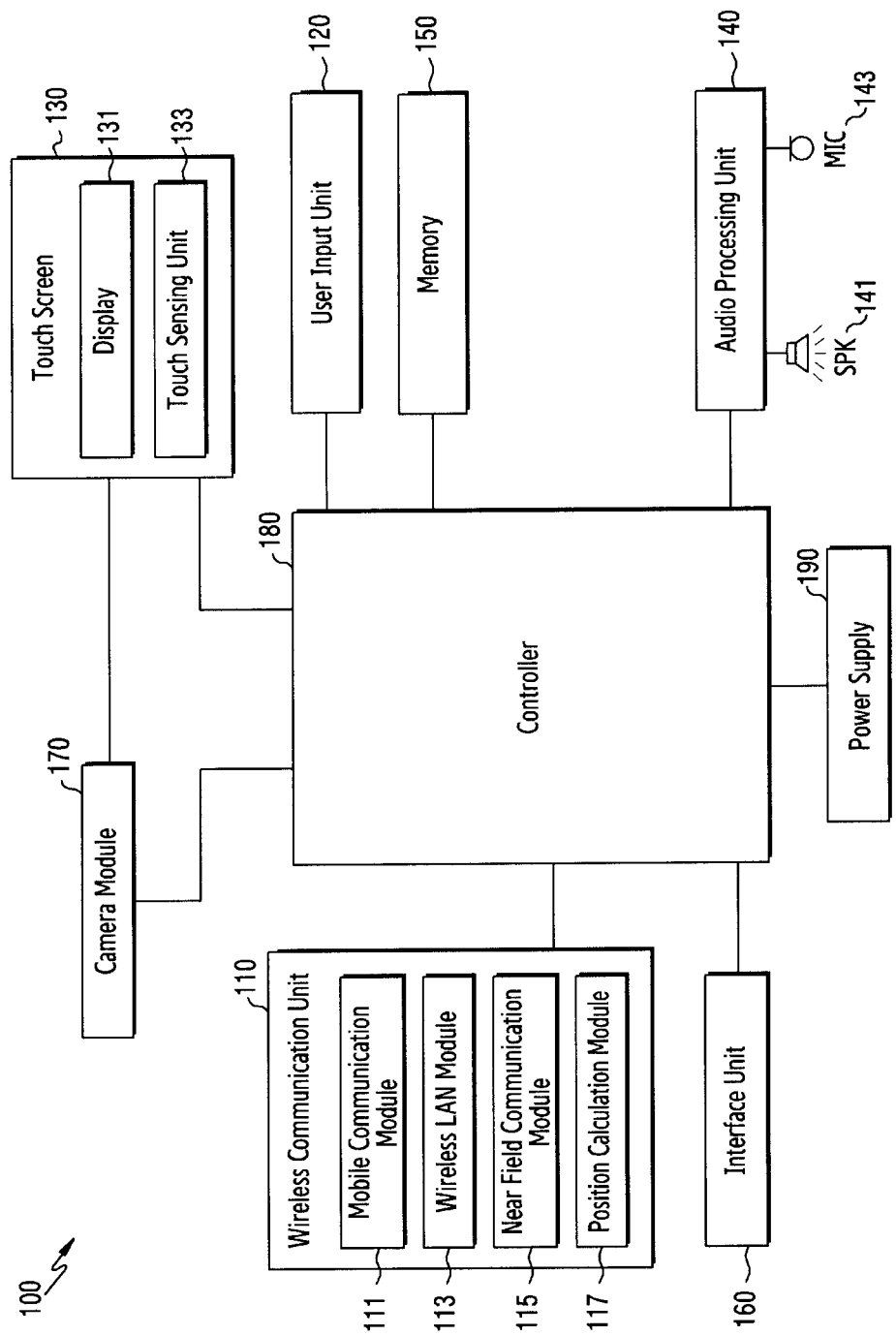
FIG. 1 is a diagram illustrating the configuration of an electronic device according to various embodiments.

Various example embodiments of the present disclosure will be described herein below with reference to the accompanying drawings. However, example embodiments and terms used herein are not intended to limit the technical features described in the present disclosure to specific embodiments and should be construed as including modifications, equivalents and/or alternatives of example embodiments of the present disclosure. In the explanation of the drawings, similar reference numerals are used for similar elements. In addition, example embodiments of the present disclosure are suggested for explanation and understanding of the technical features disclosed herein and do not limit the present disclosure. Accordingly, the present disclosure should be interpreted as including all changes based on the technical idea of the present disclosure or various other embodiments.

According to an example embodiment of the present disclosure, an electronic device may include all kinds of devices using one or more of various processors, such as an application processor (AP), a communication processor (CP), a graphic processing unit (GPU), and a central processing unit (CPU), like all information and communication devices, multimedia devices, wearable devices, and application devices therefor, which support functions according to various example embodiments of the present disclosure (for example, a display function, a screen off function operating in a low power mode (for example, an always-on display)).

An electronic device according to an example embodiment of the present disclosure may include at least one of, for example, smartphones, tablet personal computers (PCs), mobile phones, video telephones, electronic book readers, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (for example, smart glasses, head-mounted-devices (HMDs), or smart watches).

According to an example embodiment of the present disclosure, the electronic device may be a smart home appliance. For example, the smart home appliance may include at least one of televisions (TVs), digital versatile disc (DVD) players, refrigerators, air conditioners, cleaners, washing machines, set-top boxes, home automation control panels, TV boxes (e.g., Samsung HomeSync™, Apple TV™, or Google TV™), game consoles (e.g., Xbox™ and PlayStation™), or electronic picture frames. In addition, the electronic device according to an example embodiment of the present disclosure may include at least one of navigation devices or Internet of Things.

According to various embodiments, the electronic device may be one of the above-mentioned devices or a combination of one or more devices. According to a certain embodiment, the electronic device may be a flexible electronic device. In addition, the electronic device according to an example embodiment of the present disclosure is not limited to the above-mentioned devices and may include a new electronic device with the enhancement of technology.

In addition, the term "user" used in the various example embodiments may refer to a person who uses the electronic device or a device that uses the electronic device (for example, an artificial intelligence electronic device). A module or a programming module according to various embodiments may include at least one of various elements of the present disclosure, or some of the elements may be omitted, or additional other elements may be further included. Operations performed by a module, a programming module, or other elements according to various embodiments may be executed sequentially, in parallel, repeatedly, or in a heuristic method. Also, a portion of operations may be executed in different sequences, omitted, or other operations may be added.

Hereinafter, a method and an apparatus for providing a user interface related to a note according to various example embodiments of the present disclosure will be described with reference to the accompanying drawings. However, since various example embodiments of the present disclosure are not restricted or limited by the following description, it should be noted that the present disclosure can be applied to various example embodiments based on the following embodiments. In various example embodiments described below, a hardware approach method will be described by way of an example. However, since various example embodiments of the present disclosure include technology that uses both hardware and software, various example embodiments of the present disclosure do not exclude an approach method based on software.

FIG. 1 is a view showing a configuration of an electronic device according to various example embodiments.

Referring to FIG. 1, the electronic device 100 according to various example embodiments of the present disclosure may include a wireless communication unit 110, a user input unit (e.g., input circuitry, or input module) 120, a touch screen 130, an audio processor 140, a memory 150, an interface 160, a camera module 170, a controller 180, and a power supply module 190. The elements of the electronic device 100 shown in FIG. 1 are not essential in various example embodiments of the present disclosure and thus the electronic device may include more elements or fewer element than the elements shown in FIG. 1.

The wireless communication unit 110 may include one or more modules enabling wireless communication between the electronic device 100 and another external electronic device. According to various example embodiments, the wireless communication unit 110 may include a module (for example, a short-range communication module, a long-range communication module, or the like) for communicating with neighbor external electronic devices. For example, the wireless communication unit 110 may include a mobile communication module 111, a wireless local area network (LAN) module 113, a short-range communication module 115, and a location calculation module 117.

The mobile communication module 111 may exchange radio signals with at least one of a base station, an external electronic device, and various servers (for example, an integration server, a provider server, a content server, an Internet server, or a cloud server) on a mobile communication network. The radio signals may include voice signals, data signals, or control signals of various formats. The mobile communication module 111 may transmit various data utilized to operate the electronic device 100 to an external device (for example, a server or another electronic device) in response to a user request. According to various example embodiments, the mobile communication module 111 may exchange radio signals based on various communication methods. For example, the communication methods may include, but not limited to, long term evolution (LTE), LTE-Advanced (LTE-A), global system for mobile communication (GSM), enhanced data GSM environment (EDGE), code division multiple access (CDMA), wideband CDMA (WCDMA), universal mobile telecommunications system (UMTS), or orthogonal frequency division multiple access (OFDMA).

The wireless LAN module 113 may indicate a module for wirelessly connecting to the Internet and forming a wireless LAN link with other external electronic devices. The wireless LAN module 113 may be embedded in the electronic device 100 or may be provided outside the electronic device 100. The wireless Internet technology may use wireless fidelity (WiFi), wireless broadband (Wibro), world interoperability for microwave access (WiMax), high speed downlink packet access (HSDPA), or millimeter wave (mm-Wave), or the like. The wireless LAN module 113 may interwork with another external electronic device connected with the electronic device 100 via a network (for example, a wireless Internet network) to transmit various data of the electronic device 100 to the outside (for example, an external electronic device or a server) or to receive data from the outside. The wireless LAN module 113 may maintain an on state or may be turned on according to settings of the electronic device 100 or a user input.

The short-range communication module 115 may indicate a module for performing short-range communication. The short-range communication technology may use Bluetooth, Bluetooth low energy (BLE), radio frequency identification (RFID), infrared data association (IrDA), ultra wideband (UWB), Zigbee, near field communication (NFC), or the like. The short-range communication module 115 may interwork with another external electronic device (for example, an external audio device) connected with the electronic device 100 via a network (for example, a short-range communication network) to transmit various data of the electronic device 100 to an external electronic device or receive data therefrom. The short-range communication module 115 may maintain an on state or may be turned on according to settings of the electronic device 100 or a user input.

The location calculation module 117 is a module for acquiring a location of the electronic device 100 and may include, for example, a global positioning system (GPS). The location calculation module 117 may measure the location of the electronic device 100 according to the principle of triangulation. For example, the location calculation module 117 may calculate distance information on distances from three or more base stations and time information and then may calculate current location information of three dimensions according to a latitude, a longitude, and an altitude by applying triangulation to the calculated information. Alternatively, the location calculation module 117 may calculate location information by continuously receiving the location information of the electronic device 100 from three or more satellites in real time. The location information of the electronic device 100 may be acquired in various methods.

The user input unit 120 may generate input data for controlling the operation of the electronic device 100 in response to a user input. The user input unit 120 may include at least one input module for detecting user's various inputs. For example, the user input unit 120 may include a key pad, a dome switch, a physical button, a touch (capacitive/resistive), a jog & shuttle, and a sensor. According to one embodiment, the user input unit 120 may include an electronic pen (or a pen). According to one embodiment, the user input unit 120 may be implemented to receive an input of a force touch. The user input unit 120 may have a part thereof formed on the outside of the electronic device 100 in the form of a button, and a part or entirety of the user input unit 120 may be implemented as a touch panel. The user input unit 120 may receive a user input for initiating the operation of the electronic device 100 according to various example embodiments of the present disclosure, and may generate an input signal according to a user input.

The touch screen 130 may indicate an input and output device performing an input function and a display function simultaneously, and may include a display 131 and a touch sensor 133. The touch screen 130 may provide an input and output interface between the electronic device 100 and the user, may transmit a user's touch input to the electronic device 100, and may serve as a medium to show an output from the electronic device 100 to the user. The touch screen 130 may show a visual output to the user. The visual output may be displayed in the form of a text, a graphic, a video and a combination thereof. According to an example embodiment of the present disclosure, the touch screen 130 may display various screens according to operations of the electronic device 100 through the display 131. The touch screen 130 may detect an event (for example, a touch event, an approach event, a hovering event, or an air gesture event) based on at least one of a touch, hovering, or an air gesture from the user through the touch sensor 133, while displaying a specific screen through the display 131, and may transmit an input signal according to the event to the controller 180.

According to various embodiments of the present disclosure, a display 131 may display (output) various pieces of information to be processed in an electronic device 100. For example, the display 131 may display a user interface or a Graphical User Interface (GUI) associated with the operation of displaying a navigator associated with executed content according to the user's gaze information.

According to various example embodiments of the present disclosure, the display 131 may display (output) a variety of information processed in the electronic device 100. For example, the display 131 may display a user interface (UI) or a graphic user interface (GUI) which is related to: an operation of displaying a first user interface for writing a note on the display when a note event is detected in a screen off state; and an operation of displaying a second user interface related to the note when an object for fixed display included in the first user interface is selected.

The display 131 may support a screen display according to a landscape mode, a screen display according to a portrait mode, or a screen display according to a change between the landscape mode and the portrait mode according to a rotation direction (or a laying direction) of the electronic device 100. The display 131 may use various displays. According to various example embodiments, the display 131 may use a bent display. For example, the display 131 may include a bent display which can be bent, crooked, or rolled without being damaged through a substrate which is thin or flexible like paper.

The bent display may be secured to a housing (for example, a main body) and may maintain a bent state. According to various example embodiments, the electronic device 100 may be implemented by using a display device which can be freely bent or unbent like a flexible display in addition to the bent display. According to various example embodiments, the display 131 may give flexibility to be able to be folded and unfolded by substituting a glass substrate enclosing liquid crystals with a plastic film in a liquid crystal display (LCD), a light emitting diode (LED) display, an organic LED (OLED) display, an active matrix OLED (AMOLED) display, or electronic paper. According to various example embodiments, the display 131 may be extended to at least one side (at least one of a left side, a right side, an upper side, and a lower side) of the electronic device 100.

The touch sensor 133 may be seated in the display 131 and may detect a user input contacting or approaching the surface of the touch screen 130. According to an example embodiment of the present disclosure, the touch sensor 133 may receive a user input for initiating an operation related to the use of the electronic device 100 and may generate an input signal according to a user input. The user input may include a touch event or an approach event which is inputted based on at least one of a single touch, a multi-touch, hovering, or an air gesture. For example, the user input may be inputted in a method of a tap, a drag, a sweep, a swipe, a flick, a drag & drop, or a drawing gesture (for example, hand writing or the like).

The audio processor 140 may transmit an audio signal which is received from the controller 180 to a speaker 141, and may transmit an audio signal which is received from a microphone 143, such as a voice, to the controller 180. The audio processor 140 may convert voice/sound data into an audible sound and output the audible sound through the speaker 141 under the control of the controller 180, and may convert an audio signal received from the microphone 143 such as a voice into a digital signal and may transmit the digital signal to the controller 180. The audio processor 140 may output an audio signal which responds to a user input according to audio processing information (for example, a sound effect, a music file, or the like) inserted into data.

The speaker 141 may output audio data which is received from the wireless communication unit 110 or stored in the memory 150. The speaker 141 may output audio signal related to various operations (functions) performed in the electronic device 100. Although they are not shown in the embodiment of the present disclosure, the speaker 141 may have an attachable and detachable ear phone, a head phone, or a head set connected to the electronic device 100 through an external port.

The microphone 143 may receive an external audio signal and process it to electric voice data. Various noise reduction algorithms may be implemented to reduce a noise occurring in the process of the microphone 143 receiving the external audio signal. The microphone 143 may serve to input an audio stream such as a voice command (for example, a voice command for initiating a music application operation). The microphone 143 may include an internal microphone mounted in the electronic device 100 and an external microphone connected to the electronic device.

The memory 150 may store one or more programs executed by the controller 180, and may perform a function of temporarily storing inputted/outputted data. The inputted/outputted data may include files such as videos, images, photos, audios, or the like. The memory 150 may serve to store acquired data and data acquired in real time may be stored in a temporary storage device or data which is determined to be stored may be stored in a storage device which can store data for a long time.

According to various example embodiments, the memory 150 may store instructions for acquiring a content type or object information associated with an executed content, creating a navigator using the content type or the object information, placing the created navigator in the content, and displaying the navigator according to the user's gaze information. The memory 150 may store instructions to detect a note event in a screen off state, to display a first user interface for writing a note on the display, to receive a note writing input from a user, and to display a second user interface related to the note when an object for fixed display included in the first user interface is selected. According to various example embodiments, when being executed, the memory 150 may store instructions that cause the controller 180 (for example, one or more processors) to detect a note event in a screen off state, display a first user interface for writing a note on the display, receive a note writing input from a user, and display a second user interface related to the note when an object for fixed display included in the first user interface is selected.

The memory 150 may continuously or temporarily store an operating system (OS) of the electronic device 100, a program related to control of an input and a display using the touch screen 130, a program related to control of various operations (functions) of the electronic device 100, and various data generated by the operation of each program.

The memory 150 may include an extended memory (for example, an external memory) or an internal memory. The memory 150 may include a memory such as a flash memory type memory, a hard disk type memory, a micro type memory, and a card type memory (for example, a secure digital (SD) card or an eXtream digital (XD) card, and at least one type of storage medium from among a dynamic random access memory (DRAM), a static RAM (SRAM), a read only memory (ROM), a programmable ROM (PROM), an electrically erasable PROM (EEPROM), and a magnetic RAM (MRAM), a magnetic disk, and an optical disk. The electronic device 100 may operate in relation to a web storage which performs a storing function of the memory 150 on the Internet.

The memory 150 may store a variety of software. For example, the software element may include an operating system software module, a communication software module, a graphic software module, a user interface software module, a moving picture experts group (MPEG) module, a camera software module, one or more application software modules. In addition, since a module which is a software element may be expressed by a set of instructions, the module may be referred to as an instruction set. The module may also be referred to as a program.

The OS software module may include various software elements for controlling a normal system operation. Controlling the normal system operation may mean, for example, managing and controlling a memory, controlling and managing power, or the like. In addition, the OS software module may perform a function of smoothly communicating between various hardware (devices) and software elements (modules). The communication software module enables communication with another electronic device such as a computer, a server, or a mobile terminal through the wireless communication unit 110. In addition, the communication software module may be formed of a protocol structure corresponding to a corresponding communication method.

The graphic software module may include various software elements for providing and displaying graphics on the touch screen 130. The term "graphics" may be used to mean a text, a web page, an icon, a digital image, a video, an animation, or the like. The graphic software module may include various software elements related to a user interface. For example, the graphic software module may include information regarding how the state of a user interface is changed or in what condition the state of the user interface is changed.

The MPEG module may include a software element enabling a process and functions (for example, functions of generating, reproducing, distributing, and transmitting a content, or the like) related to a digital content (for example, a video, an audio). The camera software module may include a camera-related software element enabling a process and functions related to a camera. The application module may include a web browser including a rendering engine, an email, an instant message, word processing, keyboard emulation, an address book, a widget, digital right management (DRM), iris scan, context cognition, voice recognition, a location-based service, or the like. According to various example embodiments, the application module may process operations (functions) of displaying a representative color of a selected cell while outputting a sound sample corresponding to the selected cell, and displaying a trace effect on a region between two cells.

The interface 160 may receive data from another external electronic device or may be supplied with power and transmit power to the respective elements of the electronic device 100. The interface 160 may transmit internal data of the electronic device 100 to another external electronic device. For example, a wire/wireless headphone port, an external charger port, a wire/wireless data port, a memory card port, an audio input/output port, a video input/output port, an earphone port, or the like may be included in the interface 160.

The camera module 170 may indicate an element supporting a photographing function of the electronic device 100. The camera module 170 may photograph a certain subject under the control of the controller 180 and transmit photographed data (for example, an image) to the display 131 and the controller 180. The camera module 170 may include one or more image sensors. For example, the camera module 170 may include a front sensor (for example, a front camera) provided on the front surface (for example, a surface which is coplanar with the display 131) and a rear sensor (for example, a rear camera) provided on the rear surface (for example, a bottom surface) of the electronic device 100.

A controller 180 may control the overall operation of the electronic device 100. For example, the controller 180 may perform various controls associated with VR content or AR content execution (or playback), music playback, voice communication, data communication, video communication, and the like. The controller 180 may be implemented by using one or more processors or the controller 180 may be referred to as a processor. For example, the controller 180 may include a communication processor (CP), an application processor (AP), an interface (for example, a general purpose input/output (GPIO)), or an internal memory as separate elements, or may integrate them into one or more integrated circuits.

The AP may perform various functions for the electronic device 100 by executing various software programs, and the CP may process and control voice communication and data communication. In addition, the controller 180 may execute a specific software module (an instruction set) stored in the memory 150 and perform various specific functions corresponding to the module.

In various embodiments of the present disclosure, the controller 180 may be configured to perform operations of acquiring a content type or object information associated with executed content, creating a navigator using the content type or the object information, placing the created navigator in the content, and displaying the navigator according to the user's gaze information. The control operation of the controller 180 according to various embodiments of the present disclosure will be described with reference to the following drawings.

According to various example embodiments, the controller 180 may control various operations related to normal functions of the electronic device 100 in addition to the above-described functions. For example, when a specific application is executed, the controller 180 may control a management of the application and a screen display. In addition, the controller 180 may receive an input signal corresponding to various touch event or approach event inputs supported by a touch-based or approach-based input interface (for example, the touch screen 130), and may control a function management according to the input signal. In addition, the controller 180 may control exchange of various data based on wire communication or wireless communication.

The power supply module 190 may be supplied with external power or internal power under the control of the controller 180, and may supply power utilized to perform operations of the respective elements. According to an example embodiment of the present disclosure, the power supply module 190 may supply power or shut off the power supply to the display 131, the camera module 170, or the like under the control of the controller 180.

In addition, in some cases, embodiments described in the present specification may be implemented by the controller 180. In addition, according to software-based implementation, embodiments such as procedures and functions described in the present specification may be implemented by using separate software modules. Each of the software modules may perform one or more functions and operations described in the present specification FIG. 2 is a perspective view illustrating a head-mounted display according to various embodiments.

Figure 2:
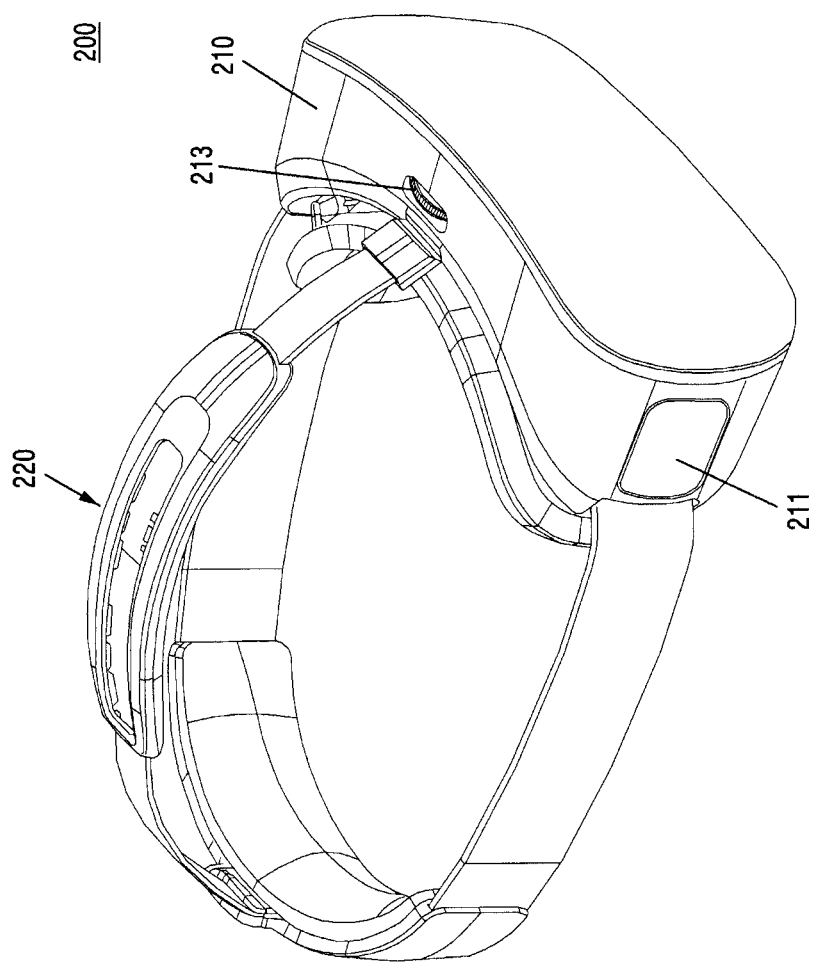
FIG. 2 is a perspective view illustrating a head-mounted display according to various embodiments.

Referring to FIG. 2, the head-mounted display 200 may be implemented as a wearable device implemented integrally with the electronic device 100. For example, the head-mounted display 200 includes a main frame 210, and a mounting unit 220 connected to the main frame 210 and configured to fix the main frame 210 to a portion of the user's body. In addition, the main frame 210 may include a user input module 211 and a display position adjustment unit 213.

For example, the user input module 211 may include at least one of a physical key, a physical button, a touch key, a joystick, a wheel key, and a touch pad. In one embodiment, when the user input module 211 is a touch pad, the touch pad may be disposed on a side face of the main frame 210. The touch pad may include a control object (e.g., a GUI configured to control content) configured to indicate the function of the head-mounted display 200.

According to one embodiment, the main frame 210 may further include a display position adjustment unit 213 on the outer surface of the main frame 210. The main frame 210 may include a space, a structure, or a cavity that can accommodate a device, such as an electronic device. The rear side of the main frame 210 may further include a face contact portion configured to be in contact with the face of the user, and a lens assembly including at least one lens at a location facing the user's two eyes may be inserted into a portion of the face contact portion. The lens assembly may be configured such that a display or a transparent/translucent lens can be integrally or detachably fixed. A portion of the face contact portion may include a nose recess having a shape into which the user's nose can be comfortably inserted.

The main frame 210 may include a plastic material, and at least one of, for example, glass, ceramic, a metal (e.g., aluminum), and a metal alloy (e.g., steel, stainless steel, or a titanium or magnesium alloy) for ensuring strength or a beautiful appearance.

The mounting unit 220 may secure the head-mounted display 200 to a portion of the user's body. The mounting unit 220 may be configured to include a band that formed of an elastic material. In other embodiments, the mounting unit 220 may include eyeglass temples, a helmet, or a strap.

Figure 3:
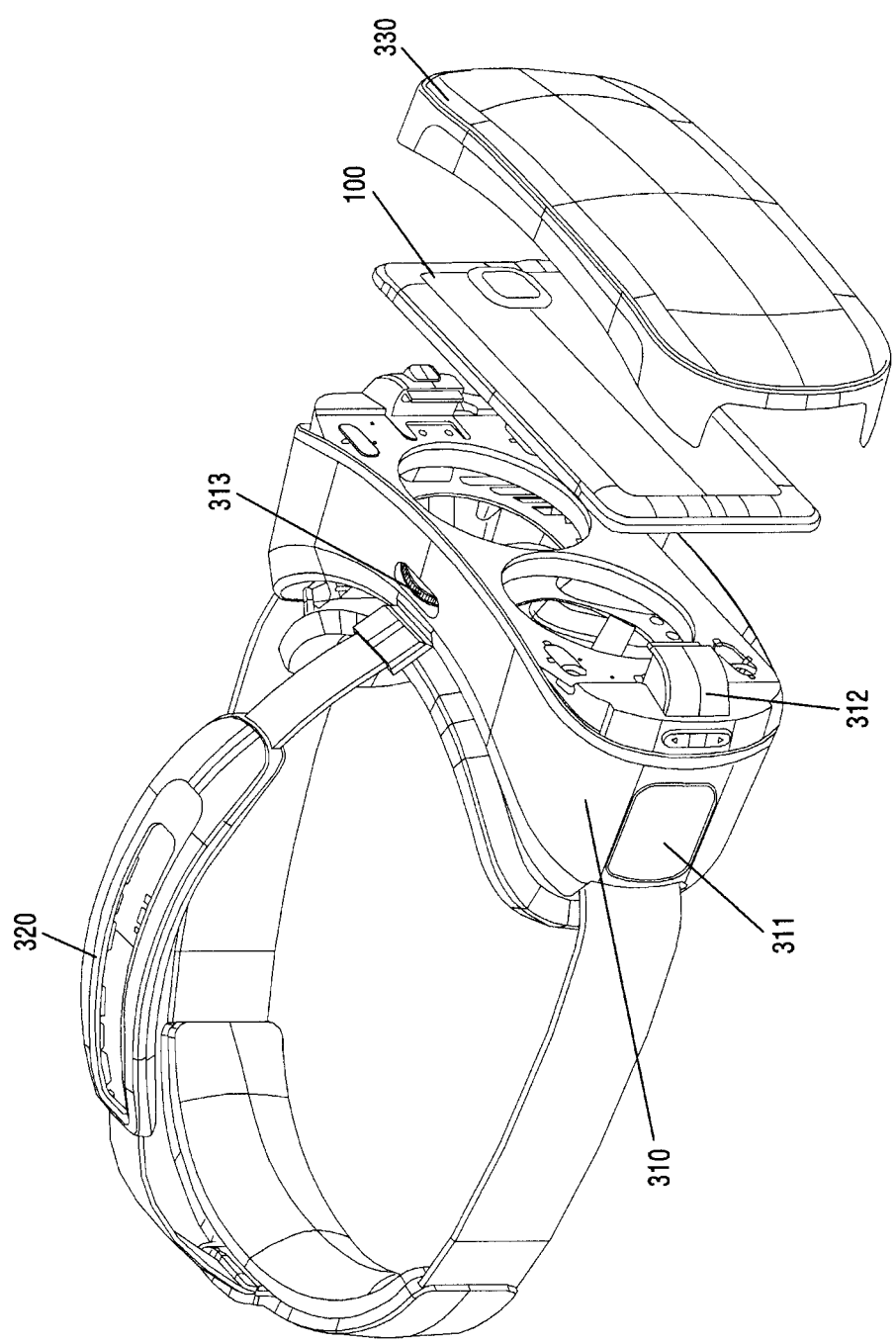
FIG. 3 is a perspective view illustrating an example of coupling an electronic device to a head-mounted display according to various embodiments.

FIG. 3 is a perspective view illustrating an example of coupling an electronic device to a head-mounted display according to various embodiments.

Referring to FIG. 3, the head-mounted display may include a main frame 310, a mounting unit 320, and a cover 330 configured to fix the electronic device 100 coupled to the main frame 310. The user may assemble the head-mounted display by coupling the electronic device 100 to the main frame 310 and then fastening the cover 330. At this time, the main frame 310 and the display 131 of the electronic device 100 may be coupled to face each other.

The main frame 310 may include a user input module 311 configured to be able to control an external device (e.g., the electronic device 100), a connector 312 configured to support communication with the electronic device 100, and a display position adjustment unit 313. Since the user input module 311 is similar to that described above with reference to FIG. 2, a detailed description thereof may be omitted. The main frame 310 may be configured to allow the electronic device 100 to be detachably attached thereto. For example, the main frame 310 may include a space, a structure, or a cavity configured to accommodate the electronic device 100. A portion forming the space in the main frame 310 may include an elastic material. The portion forming the space in the main frame 310 may include a flexible material in order to change the size of the space such that electronic devices 100 of various sizes can be accommodated in the space. The rear side of the main frame 310 may further include a face contact portion to be in contact with the user's face.

The connector 312 may support communication with the electronic device 100. The connector 312 may be connected to an electrical connection portion (e.g., a USB port) of the electronic device 100, and may provide a user input signal generated by the user input module 311 to the electronic device 100. For example, the connector 312 may be connected to the electronic device 100 using a USB interface, and may transmit a touch input received from the touch panel to the electronic device 100. The electronic device 100 may perform a function corresponding to the touch input generated by the user input module 311. For example, the electronic device 100 may control content execution in response to the touch input.

The cover 330 may be physically coupled to the main frame 310 using for example, a hook, or any other suitable coupler, such as a magnet or an electromagnet. The cover 330 may prevent the electronic device 100 from separating from the main frame 310 due to the movement of the user, and may protect the electronic device 100 from external impact.

Figure 4:
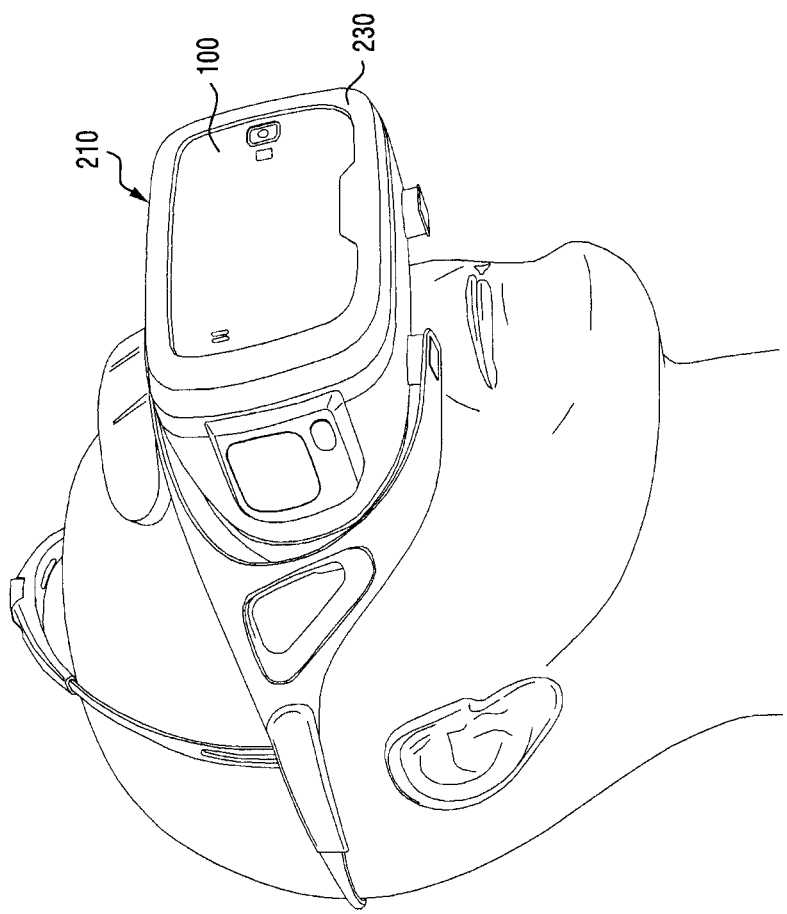
FIG. 4 is a view illustrating an example of wearing a head-mounted display according to various embodiments by a user.

FIG. 4 is a view illustrating an example of wearing a head-mounted display according to various embodiments by a user.

Referring to FIG. 4, the user can wear the head-mounted display 200 so as to visually view (e.g., watch) the screen of (or coupled within) the head-mounted display 200. For example, when the head-mounted display 200 and the electronic device 100 are coupled to each other, the user can view the screen of the display 131 of the electronic device 100 while wearing the head-mounted display 200.

The electronic device 100 described below may be the electronic device 100 of FIG. 1, the head-mounted display 200 of FIG. 2, or the head-mounted display that is coupled with an electronic device as illustrated in FIG. 3.

Figure 5:
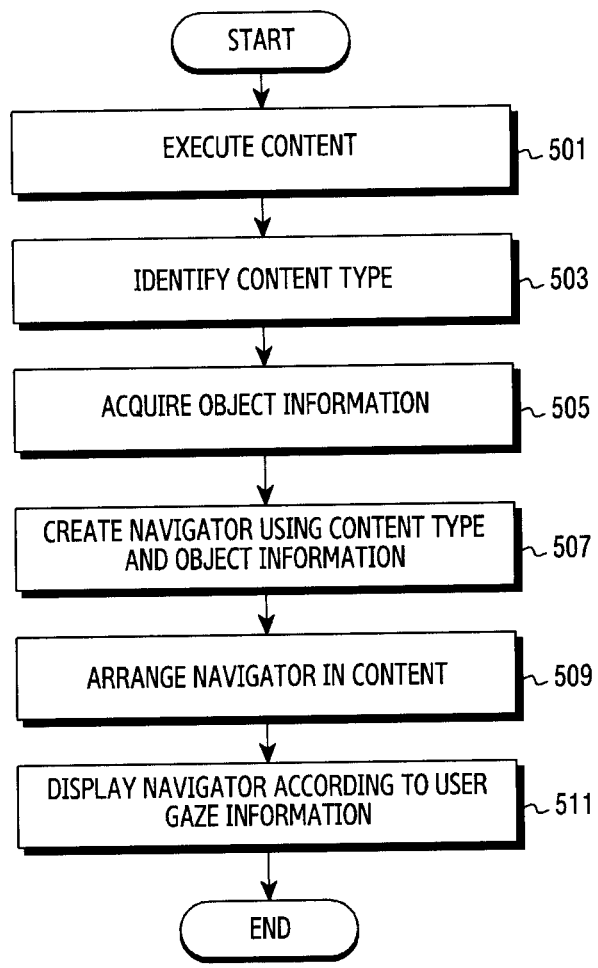
FIG. 5 is a flowchart illustrating a method of operating an electronic device according to various embodiments.

FIG. 5 is a flowchart illustrating a method of operating an electronic device according to various embodiments.

Referring to FIG. 5, in operation 501, the electronic device 100 (e.g., the controller 180) may execute content. The content may refer to data that is capable of providing a user experience by implementing virtual reality or augmented reality. For example, the user may select content to be executed (or played back) via the controller 180, and then the controller may execute the selected content.

In operation 503, the electronic device 100 (e.g., the controller 180) may identify a content type (e.g., a format in which the content is being played). The content may be configured in various content types according to a method, a format, or an attribute of configuring the content. For example, the content type may involve a display format of the content, including at least one of a 16:9 content type, a panorama content type, a 180-degree content type, or a 360-degree content type. For example, the 16:9 content type may be a type for content configured in a 16:9 aspect ratio. The 16:9 content type may be a content type in which all of the 16:9 content is visible within the user's viewing angle (e.g., 120°). The panorama content type may be a content type that gives the impression that the user views all directions, and may have a larger aspect ratio than the 16:9 content. The panorama content may have an angle somewhat larger than the user's viewing angle (e.g., 180° to 360°).

The 16:9 content or the panorama content may be two-dimensional content. The 180-degree content or the 360-degree content may be three-dimensional content. The 180-degree content may be of a type for three-dimensional content configured to have a hemispherical shape. The 360-degree content may be of a type for three-dimensional content configured to have a sphere shape.

At operation 505, the electronic device 100 (e.g., controller 180) may acquire object information. The object information may be at least one of an item, a favorite, an object, or a space included in the content. The object information may indicate what is currently visible to the user (e.g., an item, a favorite, an object, or a space) or an object that is not visible but is included in the content. When the content has already included the object information, the controller 180 may extract the object information from the content. Alternatively, when the content does not include object information, the controller 180 may analyze (or parse) the content to create object information.

In operation 507, the electronic device 100 (e.g., the controller 180) may generate a navigator using the identified content type and the acquired object information. The navigator may indicate a guide, a quick menu, and an index that are associated with the content. The navigator may be created differently according to the content type and the object information. The controller 180 according to various embodiments may create the type of the navigator differently according to the content type. The controller 180 according to various embodiments may arrange the object information in the navigator based on the distance between the user's position and the object information.

For example, the navigator may be created in the form of a circle around the location of the user. Alternatively, the navigator may be created in the form of at least one of a triangle, a square, or a polygon, in addition to the circle. In the following description, an example in which the navigator is created in the form of a circle will be described.

When the content type is the 16:9 content type, the controller 180 may create a navigator such that the object information is arranged within the user's gaze information (e.g., a viewing angle of 120 degrees). The controller 180 create the navigator such that a small circle (e.g., a second circle) is disposed in a large circle (e.g., a first circle) with reference to a center point, and the first and second circles have an interval in a portion (e.g., ⅓(120°)) therebetween. No interval may be indicated in the remaining portion (e.g., ⅔(240°)) between the first and second circles. The controller 180 may arrange the object information associated with the 16:9 content in a space between the first and second circles. The controller 180 may arrange the object information in the navigator based on the distance between the user's position and the object information. For example, an object existing close to the user's location may be located close to the user's location, and an object existing far away from the user's location may be located remote from the user's location.

When the content type is a panorama content type, the controller 180 may create a navigator such that the second circle is arranged in the first circle with reference to a center point, and the first circular shape and the second circular shape have an interval therebetween around the entire 360° area. The controller 180 may arrange the object information associated with the panorama content in the space between the first circle and the second circle. When the content type is a 180-degree content type, the controller 180 may create a navigator having one circle and may arrange the object information in a half region of the circle (e.g., ½). When the content type is a 360-degree content type, the controller 180 may create a navigator having one circle and may arrange the object information in the entire region of the circle.

In operation 509, the electronic device 100 (e.g., the controller 180) may arrange the navigator to be displayed within the display content. For example, the controller 180 may arrange the navigator at a position within the simulated display field of view, where the navigator does not displayed overlap executed content. When the content is being displayed in virtual reality, a roof, a sky, and the like of a building are mostly displayed in simulation 'above' the user's head, and the floor, ground, and the like of the building may be displayed near the user's feet. That is, the content displayed 'above' the user's head or in the near user's feet may be less important due to the fact it is more rarely viewed or focused upon. Accordingly, the controller 180 can cause the navigator to be displayed in the upper end region (e.g., a 'head' portion or in a display region near or above the user's head in virtual reality) or the 'lower' end region (e.g., a 'foot' portion or in a display region below the user's field of view, possibly near their feet in virtual reality) of the user. Alternatively, the controller 180 may arrange the navigator in some other 'meaningless' (or unnecessary) space in the content other than the upper end region or the lower end region of the user, where user attention or interaction is minimal. That is, the controller 180 may arrange the navigator in the upper or lower end region of the user, so that a distorted region of the content can be utilized and the visual disturbance for the user can be reduced.

In operation 511, the electronic device 100 (e.g., the controller 180) may display the navigator according to the user's gaze information, which indicates where the user's attention is focused relative to the display. For example, the gaze information may include at least one of a gaze direction (e.g., a user's line of sight), a viewing angle, and movements including any rotations of the user. The user may be looking straight ahead during the execution of the content. Thus, when the user is looking forward, the navigator disposed in the upper or lower end region of the user may not be visible. The controller 180 may display the navigator when the user's gaze information is positioned to look at the upper or lower end region of the user. The user may directly move to a desired item (or space) by viewing the navigator and selecting object information in the navigator.

Figure 6:
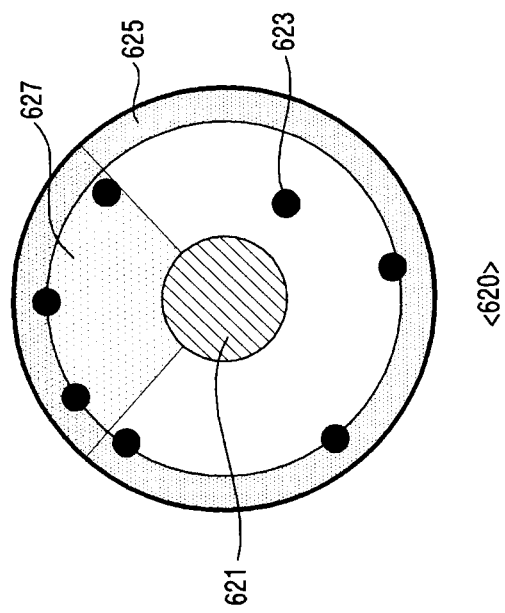
FIG. 6 is a diagram illustrating an example of arranging a navigator in content according to various embodiments.
Figure 6:
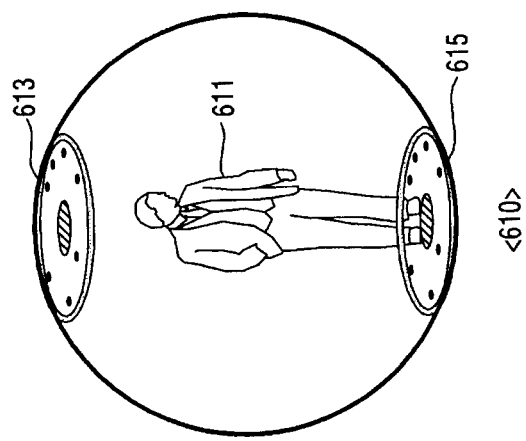

FIG. 6 is a diagram illustrating an example of arranging a navigator in content (e.g., virtual reality content) according to various embodiments.

Referring to FIG. 6, the electronic device 100 (e.g., the controller 180) may arrange a first navigator 613 or a second navigator 615 around the location of a user 611. For example, the controller 180 may arrange the first navigator 613 in the upper end region (e.g., the head portion) of the user 611, or may arrange the second navigator 615 in the lower end region (e.g., the foot portion) of the user 611. The controller 180 according to the embodiments may arrange both the first navigator 613 and the second navigator 615, or one of the first navigator 613 and the second navigator 615. The first navigator 613 and the second navigator 615 may be the same as one another, similar to one another, or different from each other. When both the first navigator 613 and the second navigator 615 are arranged, the controller 180 may configure and arrange the second navigator 615 to be different from the first navigator 613.

The third navigator 620 illustrates a possible display layout of any one of the first navigator 613 and the second navigator 615. In the third navigator 620, an interval 625 between a large circle and a small circle may be formed around the user's location 621, object information 623 may be arranged, and the user's view 627 may be displayed. The interval 625 between the two circles may be formed when the content type is a 16:9 content or panorama content. The controller 180 may adjust the width of the interval according to the content type. For example, the controller 180 may form the interval of the 16:9 content to be narrower than the interval of the panorama content. Alternatively, the controller 180 may adjust the width of the interval according to the object information included in the content.

The controller 180 may determine the location of each piece of object information based on the distance between the user's location 621 and each piece of object information. When the content type is the 16:9 content or the panorama content, the object information 623 may be placed in the interval 625 between the two circles. Alternatively, when the content type is the 180-degree content, the object information 623 may be arranged in, for example, a half region (½) of the circle. When the content type is the 360-degree content, the object information 623 may be arranged in the entire region of the circle.

The user's view 627 indicates the user's viewing information (e.g., a viewing angle or a viewing direction). In the case of the 16:9 content, the interval 625 between two circles may be formed around the user's viewing information. In the case of the 16:9 content, all the object information in the navigator may be displayed in the user's view 627. In the case of the panorama content, 180-degree content, or 360-degree content, the user's view 627 may vary according to the direction in which the user moves his/her head (e.g., clockwise or counterclockwise). According to the user's view 627 (e.g., the particular orientation in which he is looking in virtual reality), the object information, which was previously invisible to the user's eyes, may become visible.

Figure 7:
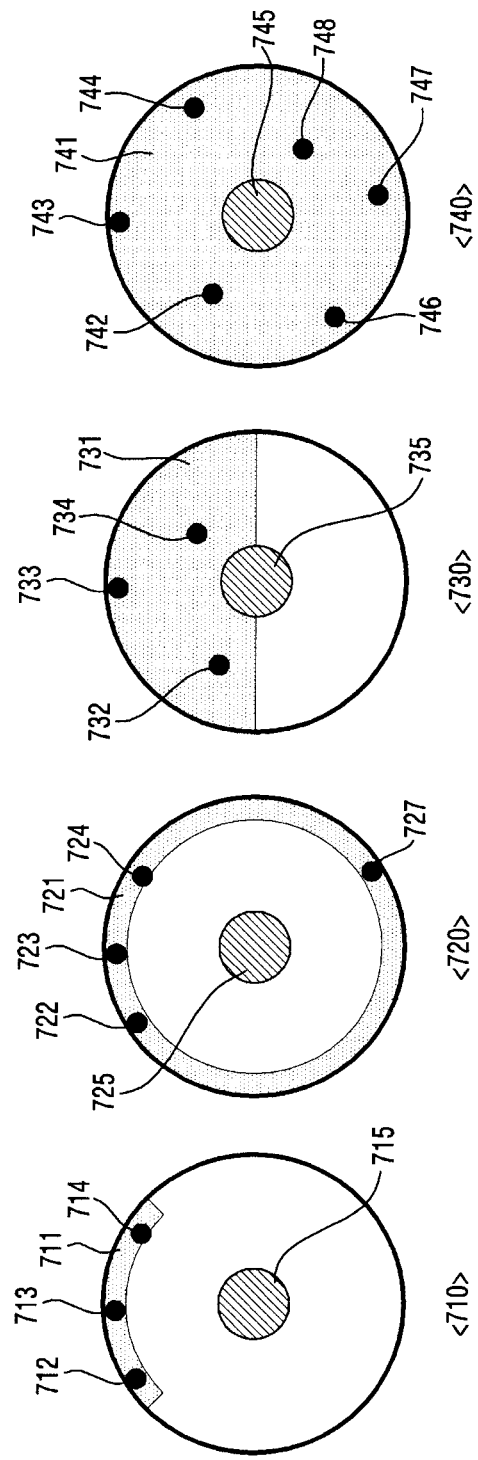
FIG. 7 is a diagram illustrating an example of configuring a navigator based on content according to various embodiments.

FIG. 7 is a diagram illustrating an example of configuring a navigator based on content according to various embodiments.

Referring to FIG. 7, a first navigator 710 illustrates an example of a navigator that is configured (or formed) in the case of the 16:9 content. The first navigator 710 may be configured to have an interval 711 in a portion (e.g., ⅓ or 120°) between the large circle and the small circle around the user's location 715. The position where the interval 711 is disposed in the first navigator 710 may correspond to the user's gaze information. In the case of the 16:9 content, the length of the interval 711 may be determined according to the user's gaze information (e.g., 120 degrees). In the case of the 16:9 content, the length of the interval 711 may be equal to the user's present viewing angle. No interval may be indicated in the remaining portion (e.g., ⅔ or 240°) between the first and second circles. The controller 180 may arrange each piece of object information in the first navigator 710 based on the distance between the user's location 715 and each piece of object information. For example, the first piece of object information 712, the second piece of object information 713, and the third piece of object information 714 may be respective items that exist at different positions from the user's location 715.

The second navigator 720 illustrates an example of a navigator configured for panorama content. The second navigator 720 may be configured such that a large circle and a small circle are formed around the user's location 725 and the second navigator 720 has an interval or space 721 between the two circles. In the case of panorama content, the length of the interval 721 may be a length including the entire circumference of the circle. The controller 180 may arrange each piece of object information in the second navigator 720 based on the distance between the user's location 725 and each piece of object information. For example, the first piece of object information 722, the second piece of object information 723, the third piece of object information 724, and the fourth piece of object information 727 may be respective items that exist at different positions from the user's location 725. In addition, the controller 180 may determine the position of each piece of object information based on the user's gaze information. For example, with reference to the current user's gaze information, the first piece of object information 722, the second piece of object information 723, or the third piece of object information 724 may correspond to the user's view (e.g., viewing direction), and the fourth piece of object information 727 may be located at a position opposite the view of the user. Here, "position opposite the user's view" may mean that it exists behind the user.

The third navigator 730 illustrates an example of a navigator configured when the content is 180-degree content. The third navigator 730 may be configured in the form of one circle around the user's location 735 and the object information may be arranged in a half region 731 (e.g., ½) of the circle. The controller 180 may arrange each piece of object information in the third navigator 730 based on the distance between the user's location 735 and each piece of object information. In addition, the controller 180 may determine the position of each piece of object information based on the user's gaze information. For example, the first piece of object information 732 may be an item that exists to the left of the second piece of object information 733 with reference to the user's view (e.g., the view direction), and the third piece of object information 734 may be an item that exists to the right of the second piece of object information 733 with reference to the user's view.

The fourth navigator 740 illustrates an example of a navigator configured in the case of 360-degree content. The fourth navigator 740 may be configured in the form of one circle around the user's location 745 and the object information may be arranged in the entire region 741 of the circle. The controller 180 may arrange each piece of object information in the fourth navigator 740 based on the distance between the user's location 745 and each piece of object information. In addition, the controller 180 may determine the position of each piece of object information based on the user's view.

For example, the first piece of object information 742, the second piece of object information 743, or the third piece of object information 744 may be an item that exists in front of the user, and the fourth piece of object information 746, the fifth piece of object information 747, or the sixth piece of object information 748 may be an item that exists behind the user. In addition, the first piece of object information 742 or the sixth piece of object information 748 may be an item that exists close to the user's location 745 and the second piece of object information 743 or the fifth piece of object information 747 may be an item that exists a long distance from the user's location 745.

Figure 8:
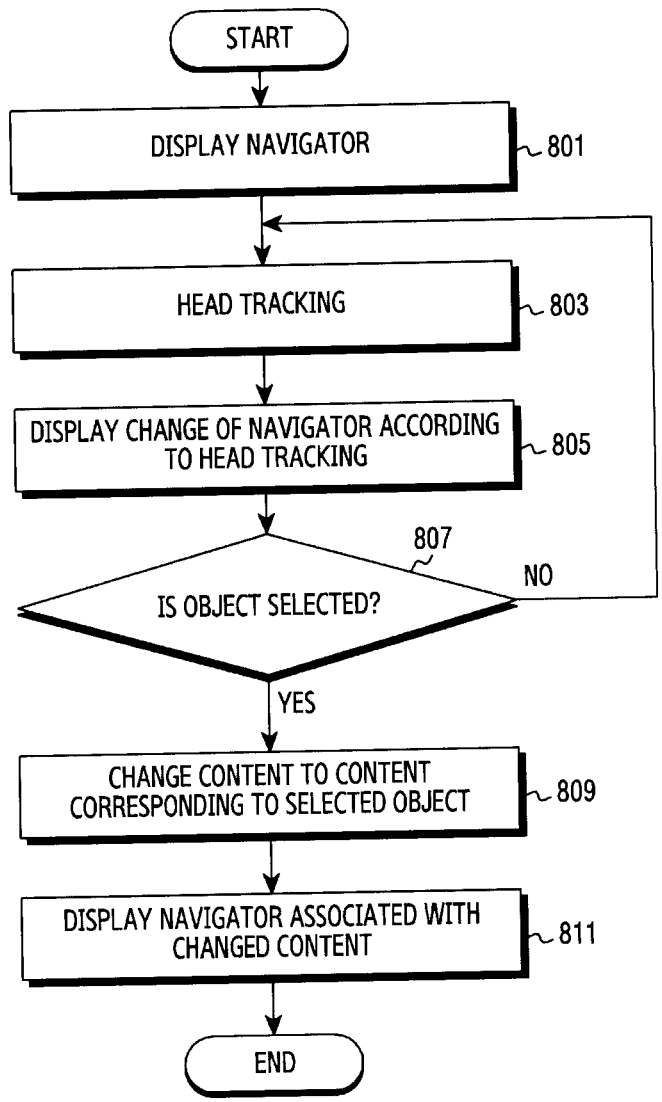
FIG. 8 is a flowchart illustrating a method of displaying a navigator of an electronic device according to various embodiments.

FIG. 8 is a flowchart illustrating a method of displaying a navigator of an electronic device according to various embodiments.

Referring to FIG. 8, in operation 801, the electronic device 100 (e.g., the controller 180) may display a navigator. The controller 180 may display the navigator according to the user's gaze information. That is, it may be a state in which the user is looking at the current navigator. The controller 180 may execute (play back) the content while the navigator is displayed. Accordingly, when the user looks at executed content without looking at the navigator, the controller 180 may provide user experience to the user through a three-dimensional User Interface (UI) of the executed content.

In operation 803, the electronic device 100 (e.g., controller 180) may perform head tracking. The controller 180 may track the movement of the user's head in any direction or combination of directions, including upward, downward, leftward, or rightward. For example, when the navigator is displayed below the user's feet, the controller 180 may track the clockwise or counterclockwise motion of the user's head while the user views (or gazes at) a location below the user's feet (e.g., 'below' in simulated virtual reality).

In operation 805, the electronic device 100 (e.g., the controller 180) may change and display the navigator according to the head tracking. Since the content is content that displays virtual reality or an augmented reality, the content (or the map of the content) may move according to the movement of the user. The controller 180 may change and display the navigator according to the movement of the content. For example, in the case where the navigator (e.g., the first navigator 710) according to the 16:9 content is being displayed in operation 801, the controller 180 may change the interval in the navigator in the clockwise or counterclockwise direction according to the head tracking, and may change the object information in the interval. Alternatively, when the navigator is a navigator associated with the 16:9 content, the controller 180 may fix the navigator without changing it.

Alternatively, in the case where the navigator (e.g., the second navigator 720) according to the panorama content is being displayed in operation 801, the controller 180 may change the object information in the navigator according to the head tracking. For example, the controller 180 may display the object information corresponding to the user's view according to the head tracking. That is, in operation 801, object information, which was not previously included in the user's view, may be subsequently displayed in operation 805. In addition, the controller 180 may process the navigator (e.g., the fourth navigator 740) according to the 360-degree content in the same or similar manner. Alternatively, in the case where the navigator (e.g., the third navigator 730) corresponding to the 180-degree content is being displayed in operation 801, the controller 180 may change the hemispherical region in the navigator clockwise or counterclockwise according to the head tracking, and may change the object information in the hemispherical region.

The controller 180 according to various embodiments may receive a rotation signal corresponding to the head tracking from an external device connected (or paired) with the electronic device 100, and may change and display the navigator based on the rotation signal. For example, the external device may be a watch-type wearable device, and the watch-type wearable device may include a rotatable rotary that is disposed on the exterior. The user may rotate the rotary of the watch-type wearable device. The watch-type wearable device may transmit a rotation signal corresponding to a rotation input of the user to the electronic device 100.

In operation 807, the electronic device 100 (e.g., the controller 180) may determine whether object information is selected. For example, the user may select object information placed below the user's feet in the navigator, by for example, a motion of 'pushing' of one of their feet. For this case, A VR peripheral would have to be attached to the user's foot or a camera (e.g., the camera module 170) of the electronic device 100 tracks a user's foot movements. The controller 180 may determine that the object information is selected when the user's gaze information (e.g., a visual line) is maintained in one or more pieces of object information for a predetermined time or longer, based on the head tracking.

When the object information is selected, the controller 180 may perform operation 809, but when the object information is not selected, the controller 180 may return to operation 803.

In operation 809, the electronic device 100 (e.g., the controller 180) may make a change to content corresponding to the selected object information. For example, the content, which is being executed in operation 801, may be content corresponding to a first museum, and the content, which is being executed in operation 809, may be content corresponding to a second museum. That is, each content may include content corresponding to one of different items (e.g., the first museum and the second museum), and the controller 180 may provide a navigator including object information corresponding to each item. The controller 180 according to various embodiments may display a thumbnail associated with the selected object information.

In operation 811, the electronic device 100 (e.g., the controller 180) may display a navigator associated with the changed content. For example, the controller 180 may perform operations of discriminating the content type of a changed content, acquiring the object information of the changed content, creating a navigator using the content type and the object information, arranging the navigator in the changed content, and displaying the navigator according to user's gaze information. That is, the controller 180 may perform operation 811 after performing operations 503 to 509 of FIG. 5.

Figure 9:
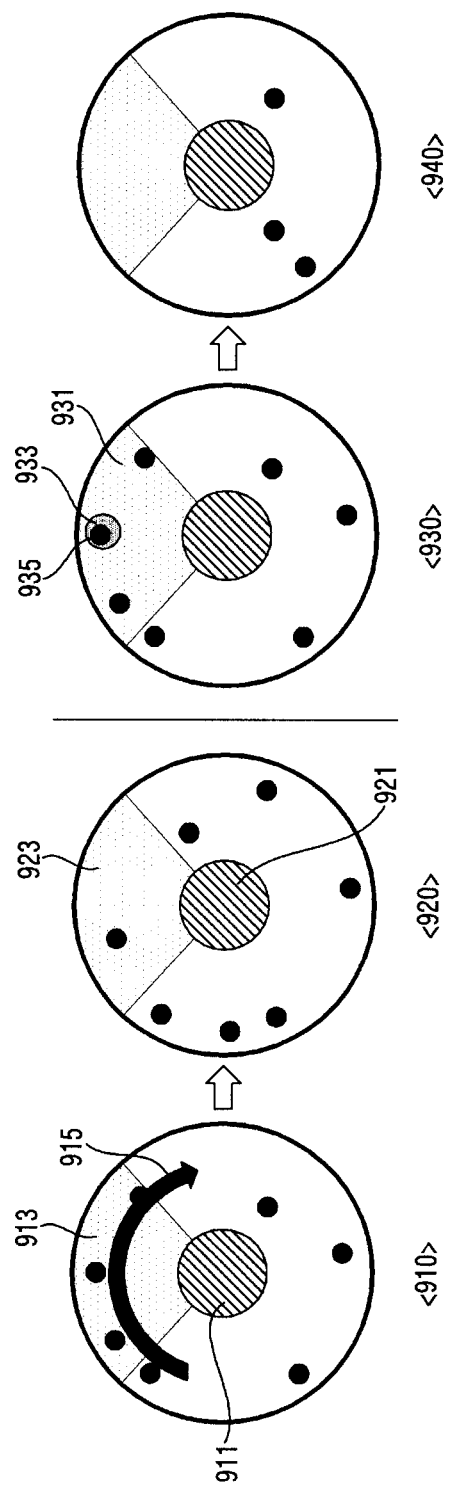
FIG. 9 is a diagram illustrating an example of displaying a navigator according to a user's viewing angle, according to various embodiments.

FIG. 9 is a diagram illustrating an example of displaying a navigator according to a user's viewing angle, according to various embodiments.

Referring to FIG. 9, the first navigator 910 illustrates an example of changing the user's gaze information 913 based on the user's head tracking 915. The first navigator 910 may have object information disposed around the user's location 911. The controller 180 may change and display the object information based on the direction of the user's head tracking 915. The direction of the head tracking 915 (e.g., the gazing direction) may be clockwise from the point of view of the user. The second navigator 920 illustrates an example after the object information has been changed according to the head tracking 915. The second navigator 920 may display object information located to the right of the user's location 921 in response to the head tracking 915 occurring in the first navigator 910 in the clockwise direction. In the second navigator 920, object information located to the right of the first navigator 910 may be displayed in the user's gaze information 923.

The third navigator 930 illustrates an example of selecting the object information 935 based on the user's visual line-of-sight (or gaze direction) 933. The user may view (or gaze at) any one of object information items included in the user's view information 931 by placing the visual line thereon for at least a predetermined time. The controller 180 may select object information 935 on which the user's visual line 933 is maintained for at least a predetermined time, from among the various object information items included in the user's present viewing information 931. The fourth navigator 940 illustrates a navigator associated with the display of content corresponding to the selected object information 935 of the third navigator 930. The controller 180 may change the content to content corresponding to the object information 935, and may configure and display a fourth navigator 940 associated with the changed content. Since the fourth navigator 940 is configured with content that is different from that of the third navigator 930, the fourth navigator 940 may be different from the third navigator 930. For example, the fourth navigator 940 may include object information that is different from that of the third navigator 930.

Figure 10:
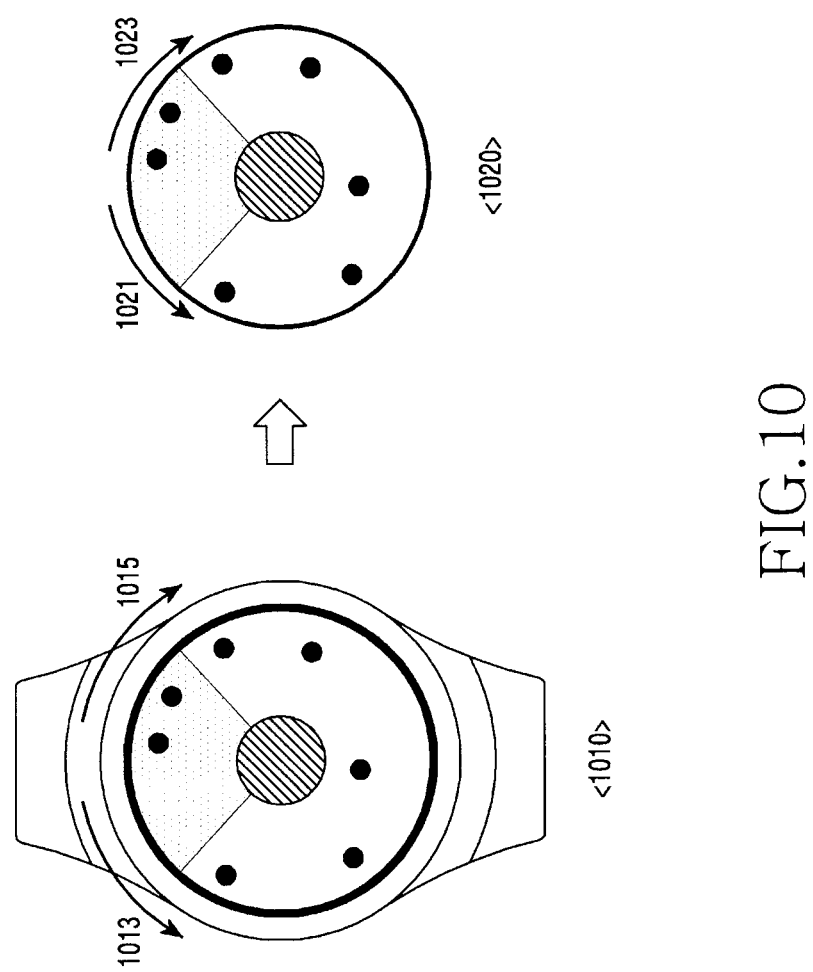
FIG. 10 is a diagram illustrating an example of displaying a navigator according to interaction with an external device, according to various embodiments.

FIG. 10 is a diagram illustrating an example of displaying a navigator according to interaction with an external device, according to various embodiments.

Referring to FIG. 10, the electronic device 100 (e.g., the controller 180) may change and display the navigator 1020 according to the interaction of the external device 1010. For example, the controller 180 may receive a rotation signal from the external device 1010 connected (or paired) with the electronic device 100. The external device may be a watch-type wearable device, and the watch-type wearable device of the present disclosure may be provided with a rotatable rotary. The user may rotate the rotary of the watch-type wearable device. The watch-type wearable device may transmit a rotation signal corresponding to a rotation input of the user to the electronic device 100. The rotation signal may include a clockwise direction 1015 and a counterclockwise direction 1013. The controller 180 may change and display the navigator 1020 based on the rotation signal. The navigator 1020 may be displayed in the state in which the object information is changed according to the rotation signal corresponding to the clockwise direction 1023 or the counterclockwise direction 1021.

The controller 180 according to various embodiments may zoom in or zoom out of a map of content using the external device. For example, when the user rotates the rotary in the clockwise direction, the controller 180 may zoom in on the map of the content, and when the user rotates the rotary in the counterclockwise direction, the controller 180 may zoom out of the map of the content. Conversely, when the user rotates the rotary in the clockwise direction, the controller 180 may zoom out of the map of the content, and when the user rotates the rotary in the counterclockwise direction, the controller 180 may zoom in on the map of the content.

The controller 180 according to various embodiments may control a content map-zooming function together with a navigator change function. For example, when the user rotates the rotary in the clockwise direction, the controller 180 may zoom in on the map of the content and may display the navigator in the state in which the navigator is moved in the clockwise direction. Alternatively, when the user rotates the rotary in the counterclockwise direction, the controller 180 may zoom out on the map of the content, and may display the navigator in the state in which the navigator is moved in the counterclockwise direction.

Figure 11:
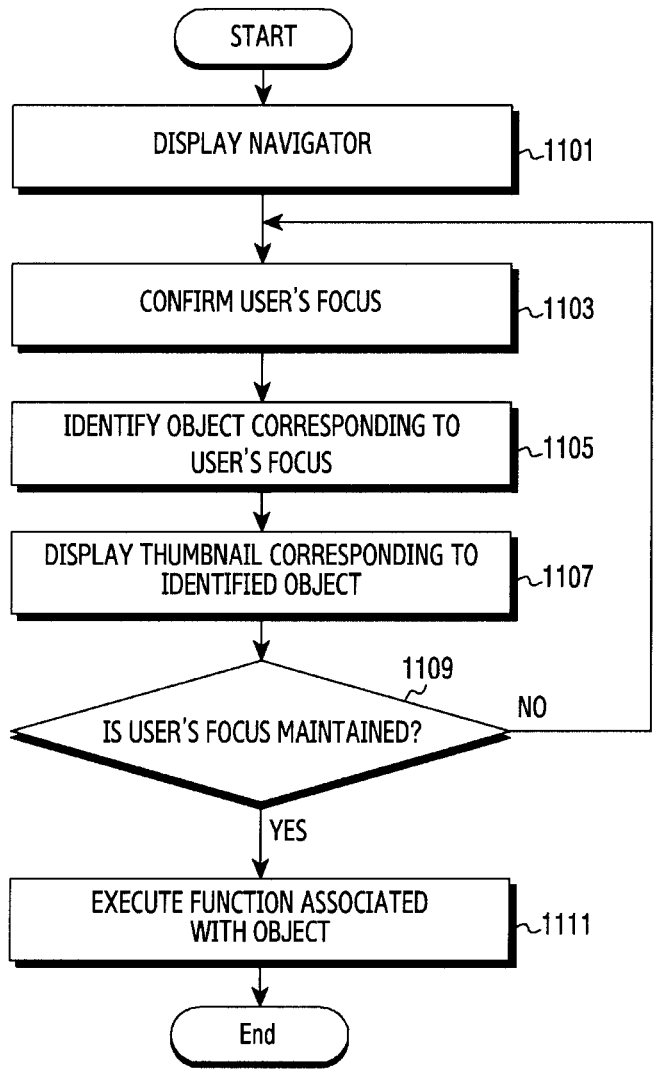
FIG. 11 is a flowchart illustrating a method of controlling a navigator of an electronic device according to various embodiments.

FIG. 11 is a flowchart illustrating a method of controlling a navigator of an electronic device according to various embodiments.

Referring to FIG. 11, in operation 1101, the electronic device 100 (e.g., the controller 180) may display a navigator. The controller 180 may display the navigator according to the user's gaze information. Since operation 1101 is similar to operation 801, a detailed description thereof may be omitted.

In operation 1103, the electronic device 100 (e.g., the controller 180) may confirm the user's focus. The user's focus may be confirmed by, for example, eye-tracking. For example, the controller 180 may confirm a user's visual line-of-sight using an eye tracking technique. Eye tracking may be used to facilitate a user input when executing virtual reality (VR) content or augmented reality (AR) content, in a manner similar to head tracking.

In operation 1105, the electronic device 100 (e.g., the controller 180) may identify object information (e.g., an object displayed on the screen) corresponding to the user's focus. For example, the controller 180 may identify the object information of the position where the user's focus is directed from among one or more object information items included in the displayed navigator. The controller 180 may detect whether the user's focus is disposed towards the particular object for a predetermined time (e.g., 3 seconds or 5 seconds), similar to the operation of selecting the object information. Alternatively, the controller 180 may identify the object information to which the user's focus is directed for a shorter predetermined time (e.g., 1 second), relative to the time for the operation of selecting the object information. Alternatively, when object information in the displayed navigator is selected (e.g., pressed) by the user using their feet, the controller 180 can identify the selected object information. For example, A VR peripheral would have to be attached to the user's foot or a camera (e.g., the camera module 170) of the electronic device 100 tracks a user's foot movements.

In operation 1107, the electronic device 100 (e.g., the controller 180) may display a thumbnail corresponding to the identified object information. The thumbnail may be a representative image (e.g., an initial image) of the content associated with the object information. The controller 180 may display the thumbnail in the form of a pop-up window or a speech balloon next to the identified object information. Alternatively, the controller 180 may display the thumbnail within the navigator. For example, when the navigator is displayed in the form of a circle and includes each piece of object information, the controller 180 may display the thumbnail inside the circle. The user may view the thumbnail and may confirm which content the object information is related to.

In operation 1109, the electronic device 100 (e.g., the controller 180) may determine whether the user's focus is maintained. For example, the controller 180 may determine whether the user's focus is maintained for a predetermined time in the identified object information.

When the user's focus is maintained, the controller 180 may perform operation 1111, and when the user's focus is not maintained, the controller 180 returns to operation 1103. The user may confirm the thumbnail corresponding to each piece of object information using the position of his/her visual line-of-sight, and may select desired object information.

In operation 1111, the electronic device 100 (e.g., the controller 180) may execute a function associated with the object information. For example, when the object information is associated with a moving image, the controller 180 may play back the corresponding moving image. Alternatively, when the object information corresponds to the contact information of a counterpart, the controller 180 may attempt to connect a call to the contact information of the counterpart. Alternatively, the controller 180 may display additional information associated with the object information. For example, when the object information corresponds to the contact information of the counterpart, the controller 180 may display a list of executable functions (e.g., telephone, message, messenger, etc.) with respect to the contact information of the counterpart.

Figure 12:
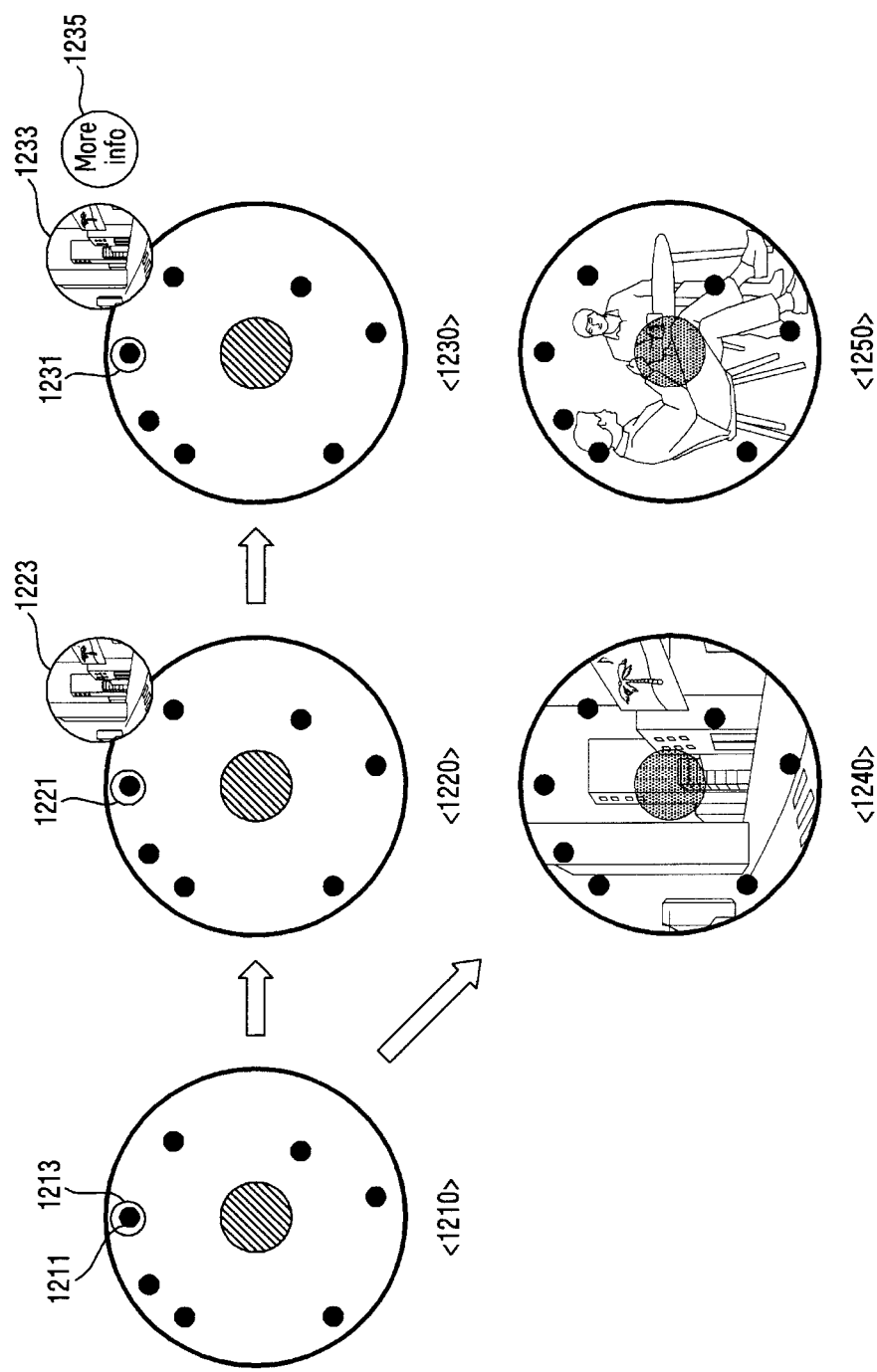
FIG. 12 is a diagram illustrating an example of providing object information in a navigator, according to various embodiments.

FIG. 12 is a diagram illustrating an example of providing object information in a navigator, according to various embodiments.

Referring to FIG. 12, the first navigator 1210 may display one or more pieces of object information including object information 1211. The controller 180 may confirm the user's visual line 1213 directed to the object information 1211 included in the first navigator 1210. Subsequently, the second navigator 1220 illustrates an example of displaying the thumbnail 1223 associated with the object information to which the user's visual line (now 1221) was directed. The thumbnail 1223 may be a representative image (or a first image) of the content associated with the object information to which the user's visual line 1221 is directed. The controller 180 may display the thumbnail 1223 at a position close to or otherwise proximate the object information to which the user's visual line 1221 is directed. When the user's visual line is directed at one piece of object information for a predetermined time, the controller 180 may display the third navigator 1230. The third navigator 1230 illustrates an example in which the thumbnail (now 1233) is displayed along with the additional information 1235, as indicated by the object information corresponding to the user's visual line (now 1231) are displayed. The additional information 1235 may represent an additional function or some additional content information associated with the object information.

The fourth navigator 1240 illustrates another example of displaying the thumbnail associated with the object information to which the user's visual line is directed in the first navigator 1210. After the initial indication of object 1211 by the user's line-of-light 1213 in element 1210, the controller 180 may display the thumbnail of object information to which the user's visual line-of-sight 1213 is directed in the entire region of the fourth navigator 1240 (e.g., inside a circle). In the fourth navigator 1240, object information may be displayed on the thumbnail. The fifth navigator 1250 illustrates another example of displaying the thumbnail associated with the object information to which the user's visual line is directed in the first navigator 1210.

Figure 13:
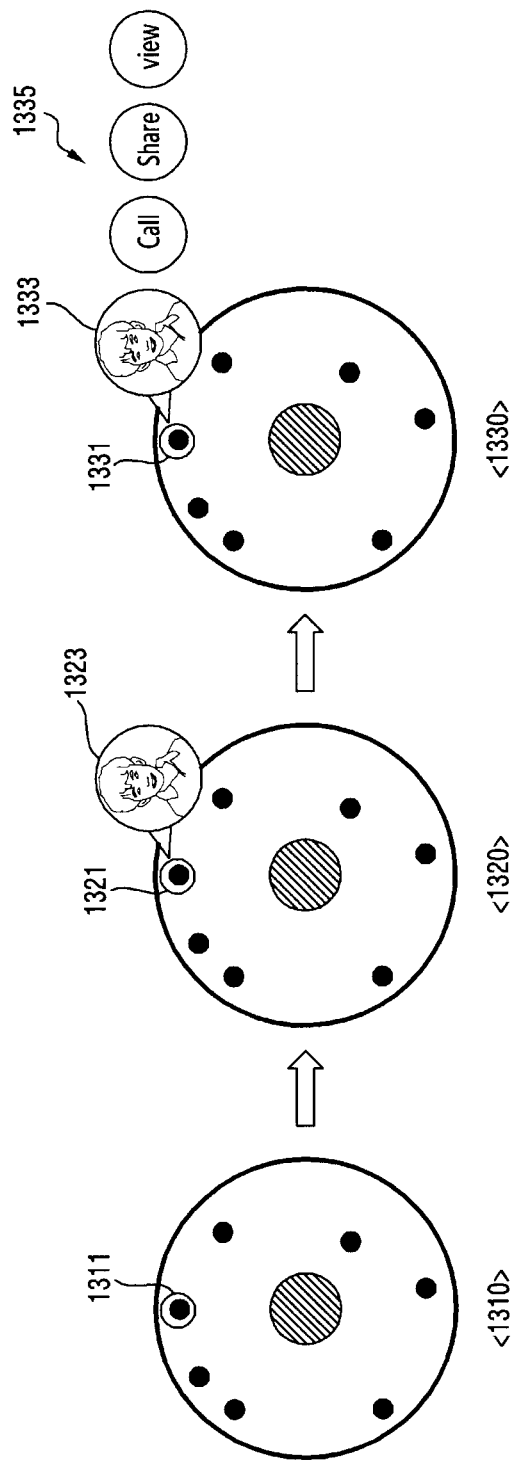
FIG. 13 is a diagram illustrating an example of executing a function associated with a navigator according to various embodiments.

FIG. 13 is a diagram illustrating an example of executing a function associated with a navigator according to various embodiments.

Referring to FIG. 13, in the first navigator 1310, one or more pieces of object information may be disposed. The object information may be counterpart or contact information (e.g., referencing one or more persons). The arranged position of the object information may be determined according to how far the counterpart's location is from the user's location in the executed content. The controller 180 can identify the object information to which the user's visual line-of-sight 1311 is directed in the first navigator 1310 using eye tracking. The second navigator 1320 illustrates an example of displaying the thumbnail 1323 associated with the object information to which the user's visual line-of-sight 1321 was directed. The controller 180 may display the thumbnail 1323 at a position close to the object information to which the user's visual line 1321 is directed. Alternatively, the controller 180 may display the thumbnail 1323 of the object information to which the user's visual line-of-sight 1321 was directed in the entire region of the second navigator 1320.

When the user's visual line-of-sight is directed at one piece of object information for a predetermined time, the controller 180 may display the third navigator 1330. The third navigator 1330 illustrates an example in which the thumbnail 1333 and the additional information 1335 for the object information corresponding to the user's visual line 1331 are displayed. In the controller 180, when the object information is a person (e.g., counterpart information), an additional function associated with a person may be, for example, a phone function, a sharing function, and a viewing function. The phone function may be to call the counterpart. The sharing function may be to invite the counterpart to the user's location. Alternatively, the sharing function may be to share information about other users and counterparts in the executed content. The viewing function may be to move to the counterpart's location.

In an embodiment of the present disclosure, a computer-readable recording medium may include a computer-readable recording medium that is recorded with a program for executing operations of obtaining a content type or object information associated with executed content, creating a navigator using the content type or object information, placing the created navigator in the content, and displaying the navigator according to the user's gaze information.

The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The instruction may include a code made by a complier or a code that can be executed by an interpreter. Operations performed by a module, a programming module, or other elements according to various embodiments may be executed sequentially, in parallel, repeatedly, or in a heuristic manner. At least some operations may be executed according to another sequence, may be omitted, or may further include other operations.

The embodiments disclosed in the present specifications and drawings are provided merely to readily describe and to help a thorough understanding of the present disclosure but are not intended to limit the present disclosure. Therefore, it should be construed that, in addition to the embodiments disclosed herein, all modifications and changes or modified and changed forms derived from the technical idea of the present disclosure fall within the present disclosure.

What is claimed is:

1. An electronic device comprising:
a display;
a memory; and
at least one processor functionally connected to the display or the memory, wherein the at least one processor is configured to:
execute a content implementing a virtual reality (VR) space or augmented reality (AR) space, including at least one first object and at least one second object;
acquire information on the at least one first object, at least one second object, and a content type for the VR space or the AR space, wherein the content type indicates a form in which the VR space or AR space is arranged;
based on the content type, determine a layout that represents an area where at least one indicator is disposable among an area in an outer boundary of a navigator;
generate and display, based on the information and the layout, the navigator including:
at least one first indicator and at least one second indicator, the at least one first indicator representing at least one first object disposed within a user's present field of view, the at least one second indicator representing at least one second object disposed outside of the user's present field of view, wherein display positions of the at least one first indicator and the at least one second indicator are determined based on a gaze direction of the user and positions of the at least one first object and the at least one second object in the VR space or the AR space, and
an icon different from the outer boundary of the navigator indicating the content type for the VR space or the AR space by visually representing a total visible area in the VR space or the AR space.

2. The electronic device of claim 1, wherein the content type is at least one of a 16:9 content type, a panorama content type, a 180-degree content type, or a 360-degree content type, and
wherein the outer boundary of the navigator is circular,
wherein when the content type is 16:9, the icon indicating the content type is an arc graphic disposed adjacent to a portion of the outer boundary of the navigator less than an entirety of the outer boundary, and
wherein when the content type is the panorama, the icon indicating the content type is an arc graphic disposed adjacent to the entirety of the outer boundary.

3. The electronic device of claim 1, wherein the information further includes information on at least one of an item, a favorite or a space included in the content, and
wherein the navigator comprises a first render of the navigator and a second render of the navigator, wherein the second render of the navigator is different from the first render, is displayed simultaneously with the first render, and is a mirror-image of the first render of the navigator.

4. The electronic device of claim 1, wherein the at least one processor is configured to:
generate a layout of the navigator differently according to the type of the content wherein the positions of the at least one first indicator and the at least one second indicator are determined further based on a distance between a position of the user and each of the positions of the at least one first object and the at least one second object.

5. The electronic device of claim 1, wherein the at least one processor is configured to:
extract the information by analyzing the content.

6. The electronic device of claim 1, wherein the at least one processor is further configured to:
perform head tracking; and
change the navigator, based on the head tracking.

7. The electronic device of claim 1, further comprising: a communication interface, wherein the at least one processor is further configured to:
receive a rotation signal from an external device operatively coupled to the communication interface; and
change the navigator according to the received rotation signal.

8. The electronic device of claim 1, wherein the at least one processor is further configured to:

change the content, when an object among the at least one first object is selected, to a content corresponding to the selected object; and configure a navigator associated with the changed content.

9. The electronic device of claim 1, wherein the at least one processor is further configured to:

display, when an object among the at least one first object is selected, a thumbnail associated with the selected object.

10. The electronic device of claim 9, wherein the at least one processor is further configured to:

execute a function for movement associated with the selected object when an user's gaze direction is maintained for a predetermined time in the selected object.

11. The electronic device of claim 1, wherein the navigator is displayed in an upper end region or a lower end region of the display in the content with reference to the user's location.

12. A method of operating an electronic device, the method comprising:

executing, by at least one processor of the electronic device, a content implementing a virtual reality (VR) space or augmented reality (AR) space, including at least one first object and at least one second object;

acquiring, by the at least one processor, information on the at least one first object, at least one second object, and a content type for the VR space or the AR space, wherein the content type indicates a form in which the VR space or AR space is arranged;

based on the content type, determining a layout that represents an area where at least one indicator is disposable among an area in an outer boundary of a navigator; and generating and displaying, by the at least one processor, based on the information and the layout, the navigator including:

at least one first indicator and at least one second indicator, the at least one first indicator representing at least one first object disposed within a user's present field-of-view, the at least one second indicator representing at least one second object disposed outside of the user's present field of view, wherein display positions of the at least one first indicator and the at least one second indicator are determined, based on a gaze direction of the user and positions of the at least one first object and the at least one second object in the VR space or the AR space, and an icon different from the outer boundary of the navigator indicating the content type for the VR space or the AR space by visually representing a total visible area in the VR space or the AR space.

13. The method of claim 12, wherein the type of the content is at least one of a 16:9 content type, a panorama content type, a 180-degree content type, or a 360-degree content type, wherein the outer boundary of the navigator is circular, wherein when the content type is 16:9, the icon indicating the content type is an arc graphic disposed adjacent to a portion of the outer boundary of the navigator less than an entirety of the outer boundary, and wherein when the content type is the panorama, the icon indicating the content type is an arc graphic disposed adjacent to the entirety of the outer boundary.

14. The method of claim 12, wherein the information further includes information on at least one of an item, a favorite, or a space included in the content, and wherein the navigator comprises a first render of the navigator and a second render of the navigator, wherein the second render of the navigator is different from the first render, displayed separately from the first render, displayed simultaneously with the first render, and a mirror-image of the first render of the navigator.

15. The method of claim 12, wherein the generating the navigator comprises:

generating a shape of the navigator differently according to the type of the content, wherein the positions of the at least one first indicator and the at least one second indicator are determined further based on a distance between a position of the user and each of the positions of the at least one first object and the at least one second object.

16. The method of claim 12, further comprising:

changing the navigator, based on head tracking.

17. The method of claim 12, further comprising:

receiving a rotation signal from an external device via a communication interface of the electronic device; and changing the navigator, based on the received rotation signal.

18. The method of claim 12, further comprising:

changing, when an object among the at least one first object is selected, a content corresponding to the selected object; and configuring a navigator associated with the changed content.

19. The method of claim 12, further comprising:

when an object among the at least one first object is selected, displaying a thumbnail associated with the selected object.

20. The method of claim 19, further comprising:

executing a function for the moving associated with the object when the user's gaze direction is maintained on the object for a predetermined time.

* * * * *